(12) United States Patent
Nielsen et al.

(10) Patent No.: US 12,125,385 B2
(45) Date of Patent: Oct. 22, 2024

(54) SYSTEM AND METHOD FOR DETECTING SEVERE ROAD EVENTS

(71) Applicant: GM Cruise Holdings LLC, San Francisco, CA (US)

(72) Inventors: Erik Nielsen, Peoria, AZ (US); Chase Kaufman, Fountain Hills, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/455,414

(22) Filed: Aug. 24, 2023

(65) Prior Publication Data

US 2023/0401961 A1  Dec. 14, 2023

Related U.S. Application Data

(63) Continuation of application No. 16/830,991, filed on Mar. 26, 2020, now Pat. No. 11,776,406.

(51) Int. Cl.
*G05D 1/00*  (2024.01)
*G08G 1/16*  (2006.01)

(52) U.S. Cl.
CPC ........... *G08G 1/164* (2013.01); *G05D 1/0088* (2013.01); *G05D 1/0285* (2013.01); *G05D 1/0291* (2013.01)

(58) Field of Classification Search
None
See application file for complete search history.

(56) References Cited

U.S. PATENT DOCUMENTS

| | | |
|---|---|---|
| 10,144,380 B2 | 12/2018 | Laskey et al. |
| 2014/0160295 A1 | 6/2014 | Kyomitsu et al. |
| 2015/0145995 A1 | 5/2015 | Shahraray et al. |
| 2016/0042644 A1 | 2/2016 | Velusamy |
| 2017/0243370 A1 | 8/2017 | Hoye et al. |
| 2018/0130353 A1 | 5/2018 | Pandurangarao |
| 2018/0154906 A1 | 6/2018 | Dudar et al. |
| 2019/0197177 A1 | 6/2019 | Bielby |
| 2019/0259226 A1 | 8/2019 | Ahmad et al. |
| 2020/0106678 A1 | 4/2020 | Grill et al. |
| 2021/0097311 A1 | 4/2021 | McBeth et al. |

*Primary Examiner* — James M Mcpherson
(74) *Attorney, Agent, or Firm* — Michael DiCato

(57) ABSTRACT

The present technology is effective to cause at least one processor to collect sensor data from at least one sensor on an autonomous vehicle, wherein the sensor data includes a plurality of measurements from the at least one sensor, identify, from the sensor data, at least one measurement from the plurality of measurements that is outside a threshold measurement for the at least one sensor and is indicative of an impact incident, send the sensor data to a remote computing system, and receive, in response to the sending of the sensor data that is indicative of the impact incident, routing instructions from the remote computing system.

20 Claims, 5 Drawing Sheets

SYSTEM AND METHOD FOR DETECTING SEVERE ROAD EVENTS

CROSS-REFERENCE TO RELATED APPLICATIONS

This application is a continuation of U.S. application Ser. No. 16/830,991, filed on Mar. 26, 2020, which is hereby incorporated by reference in its entirety.

TECHNICAL FIELD

The present technology relates to detecting severe road events and more particularly to identifying measurements in sensor data that indicate impact incidents.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Over the lifetime of a vehicle, the vehicle will likely encounter an impact incident, that is severe enough that it may cause damage to the vehicle. Skilled human drivers can identify the impact using their own senses. Furthermore, inspections for the damage to the vehicle is costly, time-consuming, and inefficient.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
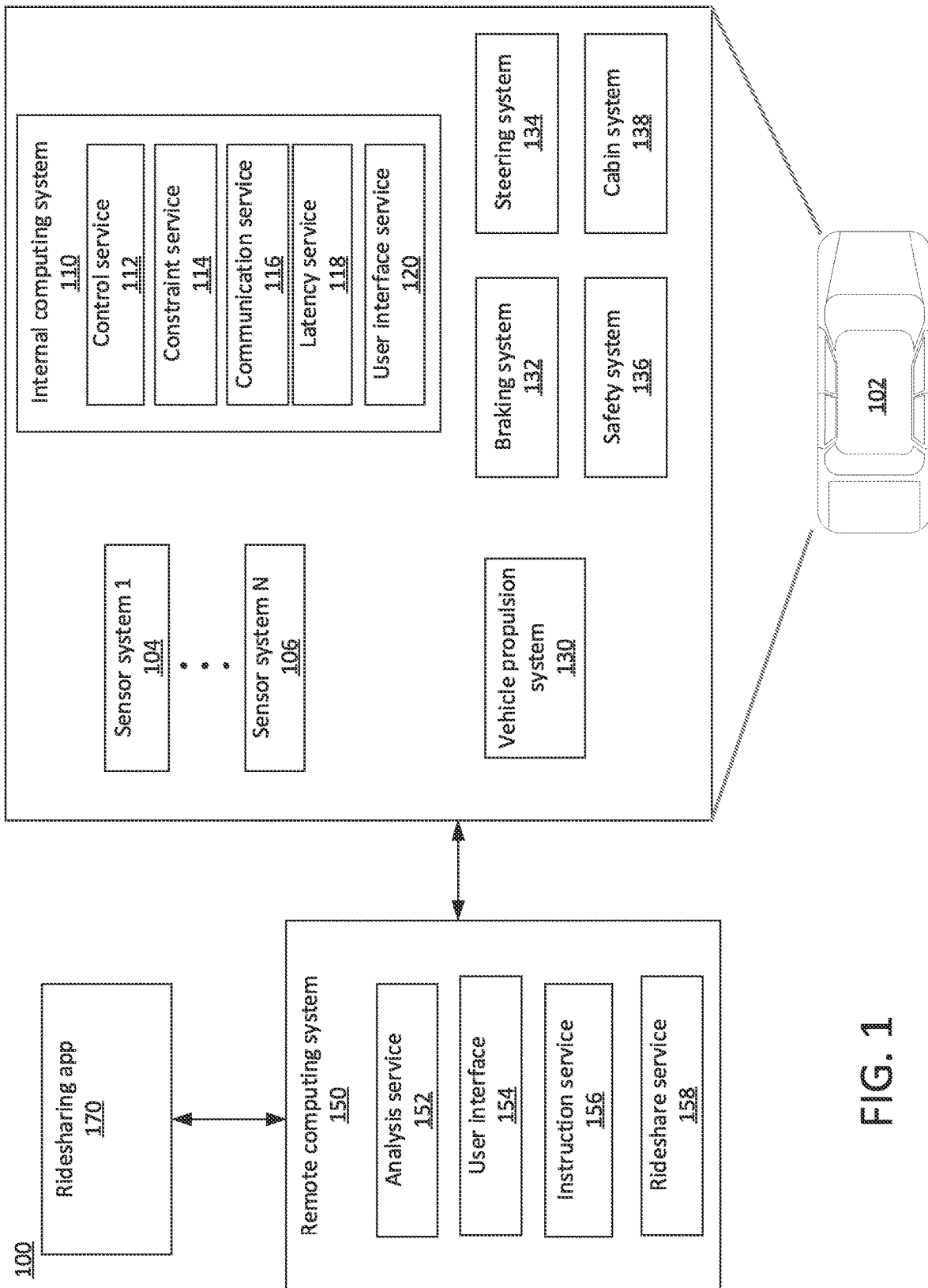
FIG. 1 shows an example system for operating an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Over the lifetime of a vehicle, the vehicle will likely encounter an impact incident that is severe enough that it may have caused damage to the vehicle. For example, a vehicle might traverse over a pothole that may result in a bent tie-rod, flat tire, bent rim, etc. Skilled human drivers can identify the impact using their own senses. Some skilled human drivers may also identify the damage to the vehicle. Other human drivers will need to bring the vehicle to a mechanic or other inspection facility to identify the damage to the vehicle. These inspections for the damage to the vehicle is costly, time-consuming, and inefficient.

Autonomous vehicles eliminate the need for human drivers, and therefore vehicles are often without any personnel that can assess the functioning of the autonomous vehicle at unscheduled times. Autonomous vehicles may utilize regularly scheduled vehicle inspections to check for needed services or repairs, but such scheduled inspections are not well suited to identifying service needs resulting from acute events such as impact incidents. Autonomous vehicles also have many sensors that can, in some specific situations, identify instances where unplanned service is needed, but these sensors may not provide sufficient data to accurately determine when a vehicle needs service. In fact, impact evets are likely to cause changes in some sensor readings, but the vehicle might not need service. In other words, relying on sensor data that identifies an impact event and/or that some change in base line sensor readings has changed can result in falsely identifying that service is needed. Avoiding extra servicing is important since these inspections are costly due to the manual labor involved and reduce vehicle availability. Conversely, sensor data might also fail to identify that a service is needed, which can result in the autonomous vehicle traversing roads while damaged, which may result in further damage to the autonomous vehicle and/or danger to passengers and/or pedestrians.

Accordingly, the disclosed technology addresses the need for a more advanced method and system to gather data from sensors of the autonomous vehicle, analyze the data, and determine whether a severe road event has occurred that requires servicing the vehicle or whether the vehicle can continue operations without servicing following an impact event.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, a regenerative braking system in an electric vehicle, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
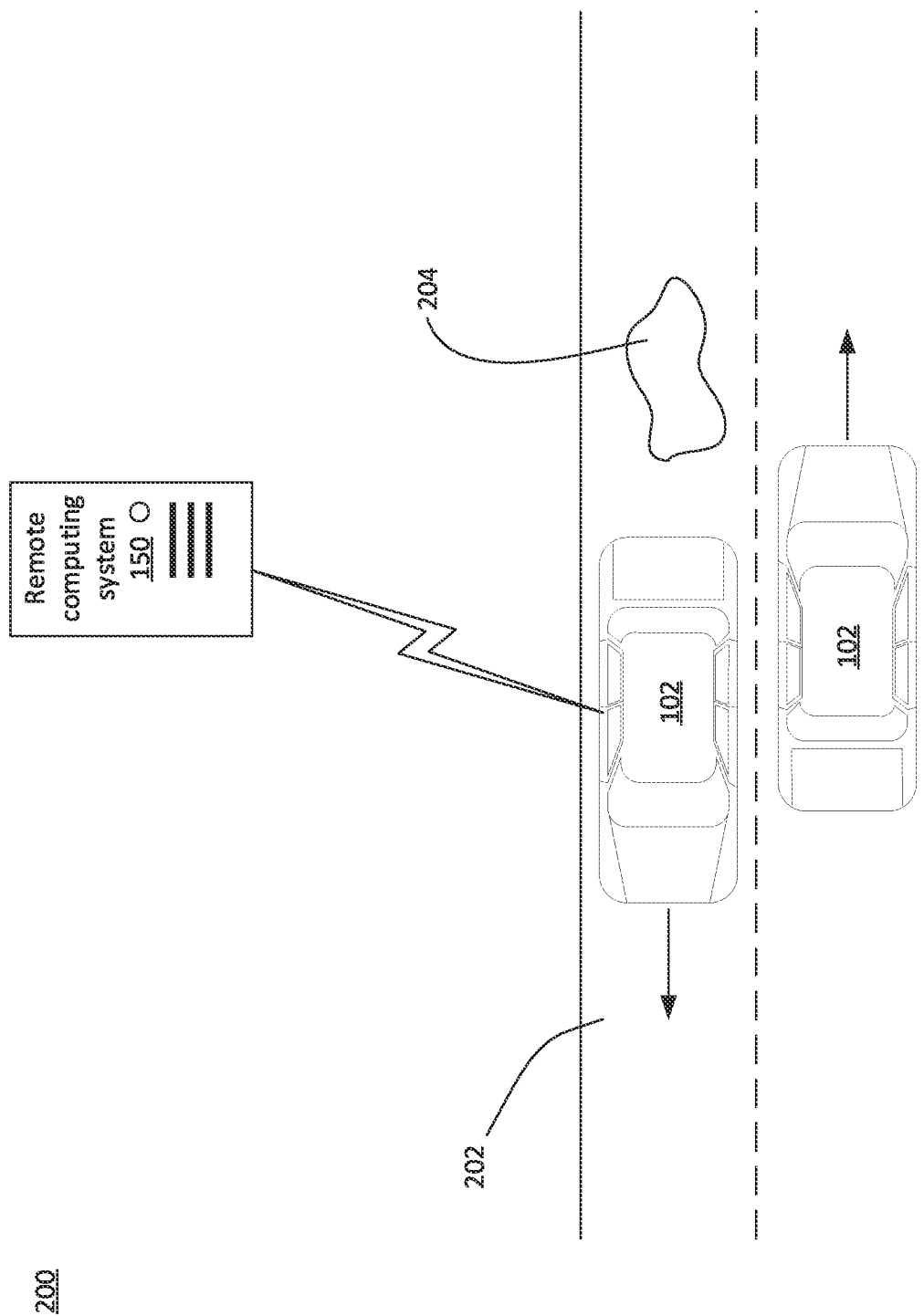
FIG. 2 shows an example environment, in which a severe road event is detected in accordance with some aspects of the present technology.

FIG. 2 shows an example environment 200, in which a severe road event is detected. More specifically, an autonomous vehicle 102 is traversing a street 202 that has a pothole 204. The autonomous vehicle 102 heading leftwards has driven over the pothole 204 and may have been damaged. As the autonomous vehicle 102 drives over the pothole 204, the sensor systems 104-106 detect measurements of various sensors and components of the autonomous vehicle 102. For example, the autonomous vehicle 102 may have suspension sensors 104-106 that detect vertical displacement of the autonomous vehicle 102 from the ground. In some embodiments, the suspension sensors 104-106 may also detect changes in the vertical displacement of the autonomous vehicle 102 over a period of time, such that a large change in vertical displacement in a short period of time may indicate that the autonomous vehicle 102 has driven over a pothole or an object, such as a manhole cover. In some embodiments, the autonomous vehicle 102 may continue to receive additional sensor data from other sensor systems 104-106 after driving over the pothole 204. For example, an alignment sensor may determine that the autonomous vehicle 102 is no longer driving in a straight line after driving over the pothole 204. As another example, the sensor systems 104-106 may monitor acceleration and/or gravitational force equivalents (g-force) of the autonomous vehicle 102 as the autonomous vehicle traverses over the pothole 204. The acceleration of the autonomous vehicle 102 may abruptly decline while the autonomous vehicle 102 traverses over the pothole 204 then return to normal. Similarly, the autonomous vehicle 102 may detect a sudden change in g-force in the direction that the autonomous vehicle 102 is traversing over the pothole 204. Thus, the sensor systems 104-106 may further an accelerometer and an inertial measurement unit IMU) sensor.

The autonomous vehicle 102, via communication service 116, may be in communication with a remote computing system 150. Accordingly, the autonomous vehicle 102 sends, via communication service 116, to the remote computing system the sensor data collected from the sensor systems 104-106. The remote computing system 104-106 may then return routing instructions to the autonomous vehicle 102. For example, if the autonomous vehicle 102 and/or the remote computing system 150 determine, based on the measurements in the sensor data, that the autonomous vehicle 102 has encountered a severe road event, the remote computing system 150 may send routing instructions to the autonomous vehicle 102 to guide the autonomous vehicle 102 to an inspection facility and/or a repair facility.

It is further contemplated that the autonomous vehicle 102 is an autonomous vehicle in a fleet of autonomous vehicles 102. As shown, the autonomous vehicle 102 driving rightwards does not encounter the severe road event. Thus, the autonomous vehicle 102 may provide sensor data that indicates a baseline measurement that the measurements of the damaged vehicle may be measured or compared against.

It is further contemplated that the sensor systems 104-106 of the autonomous vehicle 102 may detect vandalism to the autonomous vehicle 102. For example, a vandal may throw a rock at and shatter windows of the autonomous vehicle 102. A microphone or other glass breakage sensor may detect that the windows of the autonomous vehicle 102 has been damaged. The autonomous vehicle 102 may then communicate the sensor data to the remote computing system 150 and receive routing instructions to a repair facility in response to the communication.

Figure 3:
FIG. 3 shows an example method implemented by a remote computing system for detecting a severe road event in accordance with some aspects of the present technology.

FIG. 3 shows an example method 300 implemented by a remote computing system 150 for detecting a severe road event. Specifically, method 300 addresses that remote computing system 150 can collect data from autonomous vehicles in a fleet of autonomous vehicles and can use this data to identify and/or learn of impact events experienced by respective vehicles in the fleet. Thereafter, the respective vehicles experiencing impact events can be inspected by a technician or mechanic, who can enter data regarding whether a repair was needed, the nature of the repair, and/or a rating of the severity of the damage. Using this data, an algorithm can be created (human programmed heuristics, a machine learning algorithm, etc.) and send the algorithm to the autonomous vehicles in the fleet so that the individual autonomous vehicles can make determinations regarding the severity of future impact events.

The method 300 begins with the remote computing system 150 receiving 302 sensor data from autonomous vehicles 102 in a fleet of autonomous vehicles. The sensor data may indicate an impact incident experienced by a respective autonomous vehicle in the fleet and indicating measurement from sensors on the autonomous vehicle from before, during, and after the impact event.

The remote computing system 150 then receives 304 maintenance data from a user device associated with a mechanic after the mechanic has evaluated the respective autonomous vehicle in the fleet following the impact incident. The maintenance data indicates any necessary maintenance, the nature of the maintenance, and/or a rating of the severity of the damage.

The remote computing system 150 then creates 306 an algorithm from the sensor data and the maintenance data. The algorithm can receive sensor data following an impact incident and classify the impact incident as one that likely requires vehicle maintenance or one that does not likely require vehicle maintenance.

In some embodiments, the algorithm may also evaluate, based on the sensor data and the maintenance data, when an autonomous vehicle might need routine maintenance based on a number and severity of impact incidents and miles driven. In some embodiments, this evaluation may be a second algorithm. In other words, the remote computing system may create a second algorithm to evaluate when an autonomous vehicle might need routine maintenance that takes into account a number of impact events (that did not require servicing of the autonomous vehicle) encountered by a respective autonomous vehicle and the severity of those events. In some embodiments, the second algorithm may be for use by the remote computing system 150.

In some embodiments, the algorithm may be a machine learning algorithm that takes various inputs, such as the sensor data, the maintenance data, and a classification of a severity of a respective impact event, where the data is collected from a fleet of autonomous vehicles. The inputs are then given to a machine learning model to train the neural network to receive current sensor data indicating an impact event and output a respective classification of the severity of the impact event and determine whether a repair is needed. In some embodiments, the algorithm may also be trained based on miles driven, a number and severity of impact incidents, and necessary maintenance timing and needs, such that when inputted with miles driven and a number and severity of impacts, the algorithm may determine whether the autonomous vehicle may need unscheduled maintenance following an impact event. Similarly, the second algorithm may be a machine learning algorithm that takes the inputs to determine whether the autonomous vehicle may need routine maintenance.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

The remote computing system 150 then sends 308 the algorithm to the autonomous vehicles in the fleet of autonomous vehicles 102 to determine whether an impact event likely requires unscheduled vehicle maintenance.

After the fleet of autonomous vehicles 102 is running the algorithm that can classify impact events as ones likely requiring maintenance or not, a respective autonomous vehicle 102 can encounter an impact event and use the algorithm to determine whether the respective autonomous vehicle 102 likely requires unscheduled maintenance as a result of the impact event. If the algorithm determines that the respective autonomous vehicle 102 likely needs maintenance, the respective autonomous vehicle 102 can notify the remote computing system 150 of the impact event.

In some embodiments, the remote computing system may also send 308 the second algorithm to the fleet of autonomous vehicles for the respective autonomous vehicle to evaluate then that it might need maintenance. Similarly, after the fleet of autonomous vehicles is running the second algorithm to evaluate when a respective autonomous vehicle 102 may likely require routine maintenance, the respective autonomous vehicle 102 may determine, based on miles driven, a number and severity of impact incidents, and necessary maintenance timing and needs, a need for routine maintenance.

The remote computing system 150 then receives 310 a communication from the respective autonomous vehicle indicating that an impact event has been detected that likely requires maintenance.

In some embodiments, the remote computing system 150 may then request 312 further sensor data. The further sensor data may assist the remote computing system 150 in distinguishing potential false positives and/or provide additional confirmation that the impact event likely requires maintenance for the respective autonomous vehicle.

The remote computing system 150 then determines 314 that the respective autonomous vehicle does require maintenance. In some embodiments, the determination 314 may be based on a severity determination of the impact event. Accordingly, the impact events may be classified based on severity.

The remote computing system 150 then instructs 316 the respective autonomous vehicle to navigate to a particular service station at a time based on the severity determination. More specifically, the remote computing system 150 may instruct 316 autonomous vehicles 102 to the particular service station in an order of severity. In other words, autonomous vehicles 102 with more severe impact events and/or damage may be instructed 316 to navigate to the particular service station immediately, while an autonomous vehicle with a less severe impact event may be able to schedule service for a later time. Any data produced from servicing the respective autonomous vehicle 102 can also be fed into the machine learning model created at 306 to improve the model.

Figure 4:
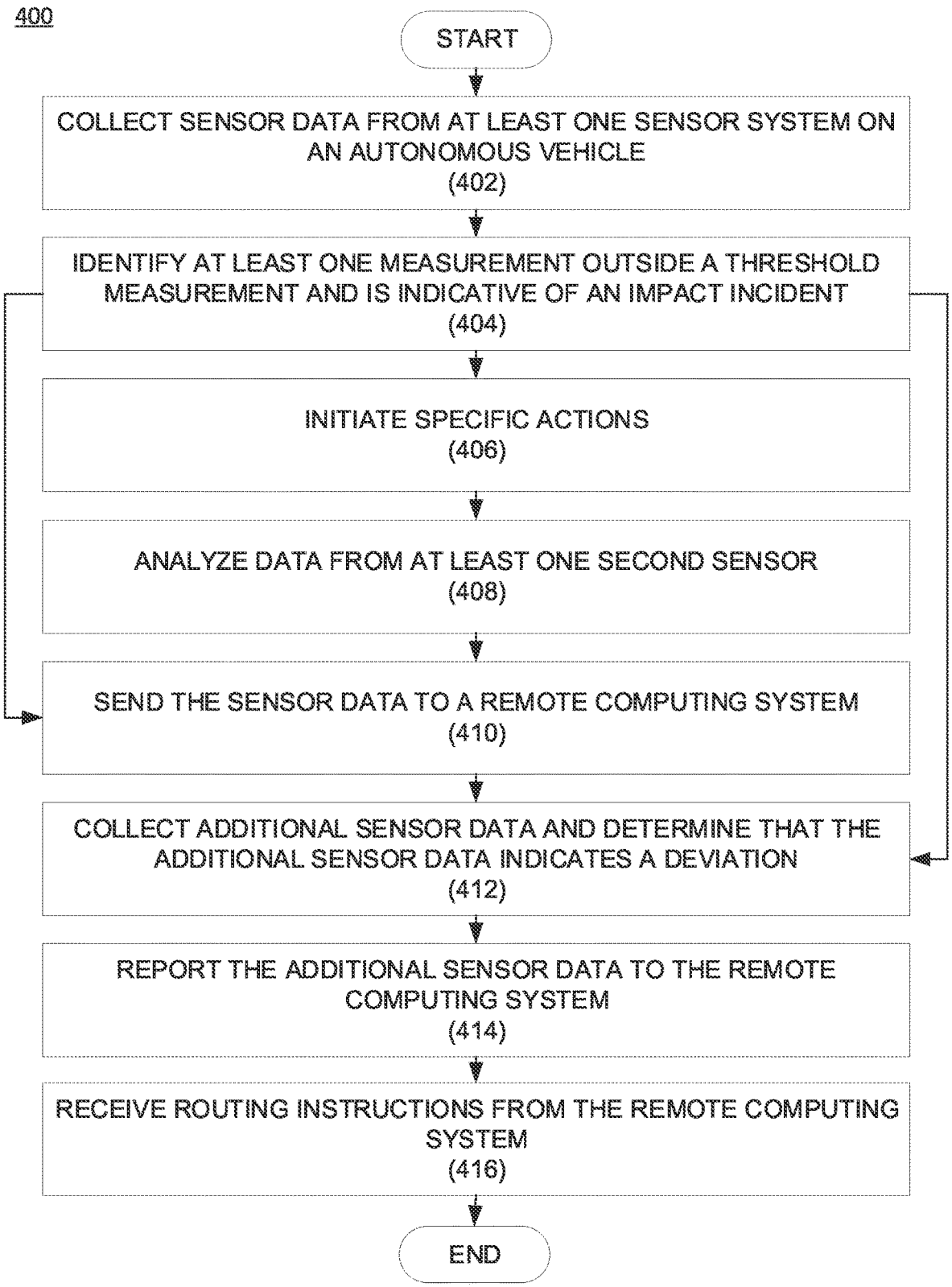
FIG. 4 shows an example method implemented by an autonomous vehicle for detecting a severe road event in accordance with some aspects of the present technology.

FIG. 4 shows an example method 400 implemented by an autonomous vehicle 102 for detecting a severe road event.

It is contemplated that the autonomous vehicle 102 may receive, from the remote computing system 150, an algorithm that is trained from a collection of sensor data received from a plurality of autonomous vehicles 102 in a fleet of autonomous vehicles 102 including the autonomous vehicle 102. The sensor data received from the plurality of autonomous vehicles is labeled with classifications of at least a severity of a respective impact event and any repair that was needed in response to the respective impact event. For example, the algorithm may be the algorithm created by the remote computing system 150 discussed above.

The method 400 begins with the autonomous vehicle 102 collecting 402 sensor data from at least one sensor on the autonomous vehicle 102. The sensor data includes a plurality of measurements from the at least one sensor. For example, the sensor may be a suspension sensor, an accelerometer, and/or an IMU sensor that collects sensor data including roll, yaw, pitch, and vertical displacement measurements. It is further contemplated that the sensor data may be later processed and calibrated based on a condition of a lane that the autonomous vehicle 102 is traversing. For example, the sensor data may be later processed and calibrated to consider whether the lane is more bumpy than other lanes.

The autonomous vehicle 102 then identifies 404 at least one measurement that is outside a threshold measurement for the at least one sensor. The at least one measurement may be indicative of an impact incident. For example, the suspension sensor may have a threshold measurement of 1 inch of vertical displacement. Thus, when the autonomous vehicle 102 drives over a pothole, the suspension sensor may identify that vertical displacement has increased over 1 inch of vertical displacement from the ground. In other words, the autonomous vehicle identifies that the vertical displacement is outside or exceeds the threshold vertical displacement of 1 inch from the ground. In some embodiments, the threshold measurement may be based upon or calibrated based on the condition of the lane that the autonomous vehicle 102 is traversing. It is further contemplated that the threshold measurement may be changed based on sensor data collected from previous trips and current trips from the autonomous vehicle 102 and the fleet of autonomous vehicles 102.

In some embodiments, the autonomous vehicle 102 may initiate 406 specific actions that identify issues in a component of the autonomous vehicle 102. In some embodiments, the specific actions can be in response to receiving 312 a request for further sensor data in FIG. 3. In some embodiments, the component of the autonomous vehicle 102 may be a component for which the sensor system 104-106 collects data. For example, the component may be a suspension system and the sensor may be a suspension sensor measuring vertical displacement. Thus, the autonomous vehicle 102 may initiate 406 specific actions to allow the at least one sensor to collect data indicating the measurements. For example, the autonomous vehicle 102 may, when safe (e.g. when no other vehicles are nearby), rapidly accelerate or break hard to identify a suspension component that compresses more than an expected and/or threshold value or measurement.

In some embodiments, the autonomous vehicle 102 may analyze 408 data from at least one second sensor to determine that the impact incident resulted in a change in a baseline reading. For example, a suspension sensor on the front right portion of an autonomous vehicle may identify vertical displacement exceeding a threshold vertical displacement. A wheel rotation sensor on the front right wheel may collect data indicating wheel rotation speed of the front right wheel. The wheel rotation sensor may identify that the front right wheel, which is proximate to the suspension sensor is rotating at a different speed from other wheels of the autonomous vehicle, all of which maintain the previous baseline reading. Thus, the wheel rotation sensor indicates that the impact incident resulted in a change in the baseline reading of the wheel rotation sensor.

The autonomous vehicle then sends 410 the sensor data to the remote computing system 150. In some embodiments, the sending 410 of the sensor data is dependent on the outcome of the analyzing 408 of the data from the at least one second sensor.

As shown, in some embodiments, after identifying 404 at least one measurement that is outside of the threshold measurement and is indicative of an impact incident, the autonomous vehicle 102 may immediately send 410 the sensor data to the remote computing system 150 without initiating 406 specific actions and/or analyzing 408 data from at least one second sensor.

In some embodiments, the autonomous vehicle 102 may collect 412 additional sensor data and determine that the additional sensor data indicates a deviation from the sensor data previously collected in relation to the impact incident and is greater than a threshold deviation. More specifically, the additional sensor data is collected after the impact incident occurred, such that the additional sensor data indicates a second impact event from driving over a second hazard in the road. For example, the autonomous vehicle 102 may continue traversing the lane after hitting the pothole and encounter a second pothole. The suspension sensor of the autonomous vehicle 102 may continue to collect 412 additional sensor data that indicates increased vertical displacement after hitting the second pothole.

In some embodiments, the additional sensor data may also indicate that the deviation is greater than a threshold deviation. For example, the suspension sensor of the autonomous vehicle 102 may have a threshold deviation of 0.25" from a baseline vertical displacement from the ground. After hitting the pothole, the suspension sensor may indicate that the suspension component now sags and deviates 0.5" from the baseline vertical displacement from the ground. In some embodiments, the threshold deviation may be based upon or calibrated for the condition of the lane that the autonomous vehicle 102 is traversing.

As shown, in some embodiments, after identifying 404 at least one measurement that is outside of the threshold measurement and is indicative of an impact incident, the autonomous vehicle 102 may immediately collect 412 additional sensor data and determine that the additional sensor data indicates a deviation without initiating 406 specific actions, analyzing 408 data from at least one second sensor, and/or sending the sensor data 410 to the remote computing system.

In some embodiments, the autonomous vehicle 102 may then report 414 the additional sensor data to the remote computing system 150. In some embodiments, the reporting 414 of the additional sensor data is dependent on the outcome of the analyzing the data from the at least one second sensor. In some embodiments, the reporting 414 may also include the sensor data originally collected 402 by the autonomous vehicle 102.

The autonomous vehicle 102 may then receive 416 routing instructions from the remote computing system 150. Depending on whether the autonomous vehicle 102 requires unscheduled servicing and a severity of the impact event, the routing instructions may guide the autonomous vehicle 102 to a particular service station at a specific time. In some embodiments, when it is determined that unscheduled servicing is not yet required, the autonomous vehicle 102 may receive routing instructions that guide the autonomous vehicle 102 to continue driving without stopping at a particular service station.

Collectively, the methods illustrated in FIG. 3 and FIG. 4 provide efficiencies in managing a fleet of autonomous vehicles by first allowing a specific autonomous vehicle to self-assess the severity of an impact incident. In many cases, the specific autonomous vehicle will determine that the impact incident is not of any concern and can continue with operations. However, in some embodiments, the specific autonomous vehicle might determine that the impact event was of a character that was sufficiently likely that the autonomous vehicle would need service, either immediately, or soon. In such embodiments, the specific autonomous vehicle can communicate with the remote computing system 150 to further assess any damage, confirm whether servicing is needed, and schedule servicing either immediately or in the future, depending on the necessity of the repair.

In some embodiments, the present technology can also be used to avoid impact events. The received sensor data may be interpreted by a remote computing system 150 to place and characterize a road hazard on a map. In other words, data regarding impact events can also be provided to a mapping service on remote computing system 150 which can locate persistent hazards, such as potholes, on a map used by the autonomous vehicles to navigate. This information can be used to instruct the autonomous vehicles to utilize lanes that avoid the persistent hazard, to drive in a position of a lane that avoids the persistent hazard, or to minimize the impact of the persistent hazard.

Additionally, the present technology can be used to monitor the evolution of a persistent hazard. If remote computing system 150 already had data identifying the road hazard, the remote computing system 150 can use the sensor data to determine that the road hazard is getting more severe. For example, the present technology can analyze data from autonomous vehicles encountering the persistent hazard over time and note how the hazard is evolving (e.g. a pothole might be getting bigger).

Figure 5:
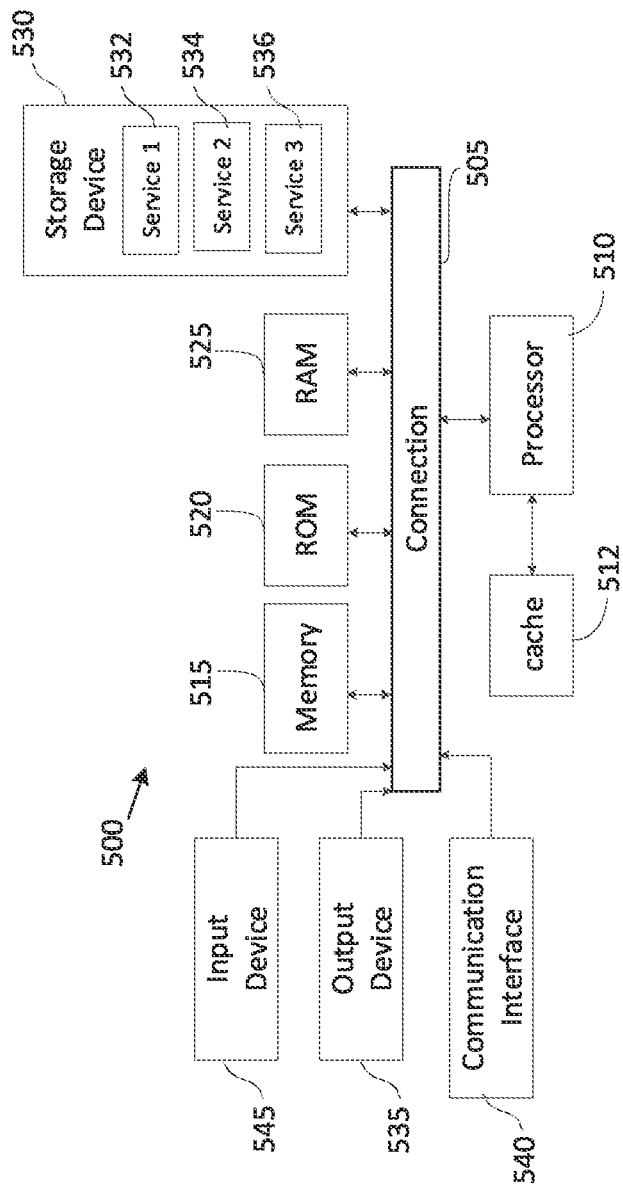
FIG. 5 shows an example of a system for implementing certain aspects of the present technology.

FIG. 5 shows an example of computing system 500, which can be for example any computing device making up internal computing system 110, remote computing system 150, (potential) passenger device executing rideshare app 170, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   determining, based on an algorithm, that an autonomous vehicle (AV) needs a repair to the autonomous vehicle as a result of an impact incident;
   sending, to a remote computing system, data indicating a classification of a severity of the impact incident, the severity of the impact incident being classified based on sensor data from a least one sensor of the autonomous vehicle; and
   after sending the data indicating the severity of the impact incident, receiving, from the remote computing system, routing instructions instructing the autonomous vehicle to navigate to a particular service station to receive maintenance in a particular order with respect to other autonomous vehicles, wherein the particular order is based on the severity of the impact incident.

2. The computer-implemented method of claim 1, wherein the algorithm is a machine learning algorithm, and wherein the machine learning algorithm determines that the AV needs the repair based on one or more inputs, the one or more inputs comprising at least one of the sensor data or maintenance data associated with the AV.

3. The computer-implemented method of claim 2, wherein the one or more inputs further comprise at least one of a number of impact incidents, a number of miles that the AV has driven, or a maintenance timing of the AV.

4. The computer-implemented method of claim 1, wherein the severity of the impact incident is based on a damage or type of damage endured by the AV, and wherein the particular order is based on the severity of the impact incident and a frequency of impact events associated with the AV.

5. The computer-implemented method of claim 1, further comprising identifying, from the sensor data, at least one measurement from the sensor data that is outside a threshold measurement for the at least one sensor, and wherein the threshold measurement is based on a suspension sensor with a threshold vertical displacement relative to a ground.

6. The computer-implemented method of claim 1, further comprising sending, to the remote computing system, impact incident validation data, wherein the impact incident validation data indicates a deviation from at least a portion of sensor data collected in relation to the impact incident, and wherein the deviation is greater than a threshold deviation.

7. The computer-implemented method of claim 1, wherein the particular order comprises a time or time window for navigating to or arriving at the particular service station that is determined based on the severity of the impact incident.

8. A system comprising:
   at least one memory; and
   at least one processor coupled to the at least one memory, the at least one processor configured to:
   determine, based on an algorithm, that an autonomous vehicle (AV) needs a repair to the autonomous vehicle as a result of an impact incident;
   send, to a remote computing system, data indicating a classification of a severity of the impact incident, the severity of the impact incident being classified based on sensor data from a least one sensor of the autonomous vehicle; and
   after sending the data indicating the severity of the impact incident, receive, from the remote computing system, routing instructions instructing the autonomous vehicle to navigate to a particular service station to receive maintenance in a particular order with respect to other autonomous vehicles, wherein the particular order is based on the severity of the impact incident.

9. The system of claim 8, wherein the algorithm is a machine learning algorithm, and wherein the machine learning algorithm determines that the AV needs the repair based on one or more inputs, the one or more inputs comprising at least one of the sensor data or maintenance data associated with the AV.

10. The system of claim 9, wherein the one or more inputs further comprise at least one of a number of impact incidents, a number of miles that the AV has driven, or a maintenance timing of the AV.

11. The system of claim 8, wherein the severity of the impact incident is based on a damage or type of damage endured by the AV, and wherein the particular order is based on the severity of the impact incident and a frequency of impact events associated with the AV.

12. The system of claim 8, wherein the at least one processor is configured to identify, from the sensor data, at least one measurement from the sensor data that is outside a threshold measurement for the at least one sensor, and wherein the threshold measurement is based on a suspension sensor with a threshold vertical displacement relative to a ground.

13. The system of claim 8, wherein the at least one processor is configured to send, to the remote computing system, impact incident validation data, wherein the impact incident validation data indicates a deviation from at least a portion of sensor data collected in relation to the impact incident, and wherein the deviation is greater than a threshold deviation.

14. The system of claim 8, wherein the particular order comprises a time or time window for navigating to or arriving at the particular service station that is determined based on the severity of the impact incident.

15. A non-transitory computer-readable storage medium comprising instructions thereon which, when executed by one or more processors, cause the one or more processors to:
   determine, based on an algorithm, that an autonomous vehicle (AV) needs a repair to the autonomous vehicle as a result of an impact incident;
   send, to a remote computing system, data indicating a classification of a severity of the impact incident, the severity of the impact incident being classified based on sensor data from a least one sensor of the autonomous vehicle; and
   after sending the data indicating the severity of the impact incident, receive, from the remote computing system, routing instructions instructing the autonomous vehicle to navigate to a particular service station to receive maintenance in a particular order with respect to other autonomous vehicles, wherein the particular order is based on the severity of the impact incident.

16. The non-transitory computer-readable storage medium of claim 15, wherein the algorithm is a machine learning algorithm, and wherein the machine learning algorithm determines that the AV needs the repair based on one or more inputs, the one or more inputs comprising at least one of the sensor data or maintenance data associated with the AV.

17. The non-transitory computer-readable storage medium of claim 16, wherein the one or more inputs further comprise at least one of a number of impact incidents, a number of miles that the AV has driven, or a maintenance timing of the AV.

18. The non-transitory computer-readable storage medium of claim 15, wherein the severity of the impact incident is based on a damage or type of damage endured by the AV, and wherein the particular order is based on the severity of the impact incident and a frequency of impact events associated with the AV.

19. The non-transitory computer-readable storage medium of claim 15, wherein the instructions, when executed by the one or more processors, cause the one or more processors to identify, from the sensor data, at least one measurement from the sensor data that is outside a threshold measurement for the at least one sensor, and wherein the threshold measurement is based on a suspension sensor with a threshold vertical displacement relative to a ground.

20. The non-transitory computer-readable storage medium of claim 15, wherein the instructions, when executed by the one or more processors, cause the one or more processors to send, to the remote computing system, impact incident validation data, wherein the impact incident validation data indicates a deviation from at least a portion of sensor data collected in relation to the impact incident, and wherein the deviation is greater than a threshold deviation.

* * * * *